United States Patent
Eichberger et al.

(10) Patent No.: US 6,524,362 B1
(45) Date of Patent: Feb. 25, 2003

(54) METHOD OF MELTING FINE GRAINED DIRECT REDUCED IRON IN AN ELECTRIC ARC FURNACE

(75) Inventors: Heinz Eichberger, Bad Soden (DE); Siegfried Schimo, Friedrichsdorf (DE); Michael Stroeder, Anspach (DE); William Wells, Oakville (CA)

(73) Assignee: Metallgesellschaft AG, Frankfurt am Main (DE)

( * ) Notice: Subject to any disclaimer, the term of this patent is extended or adjusted under 35 U.S.C. 154(b) by 0 days.

(21) Appl. No.: 09/509,182

(22) PCT Filed: Oct. 2, 1998

(86) PCT No.: PCT/EP98/06276

§ 371 (c)(1),
(2), (4) Date: Jul. 17, 2000

(87) PCT Pub. No.: WO99/18245

PCT Pub. Date: Apr. 15, 1999

(30) Foreign Application Priority Data

Oct. 7, 1997 (DE) .......................................... 197 44 151

(51) Int. Cl.[7] .............................................. C12B 11/10
(52) U.S. Cl. ..................................... 75/10.46; 75/10.63
(58) Field of Search ............................... 75/10.46, 10.63

(56) References Cited

U.S. PATENT DOCUMENTS

| | | | |
|---|---|---|---|
| 3,472,649 A | | 10/1969 | Sibakin et al. |
| 4,564,388 A | * | 1/1986 | Vallomy .................... 75/10.12 |
| 4,986,847 A | | 1/1991 | Knapp et al. |
| 5,611,838 A | | 3/1997 | Fritz et al. |

FOREIGN PATENT DOCUMENTS

| | | |
|---|---|---|
| CA | 2129407 A | 2/1995 |
| DE | 15 08 222 A | 10/1969 |
| DE | 19608530 A | 8/1997 |
| EP | 06 37 634 A | 2/1995 |
| EP | 06 57 549 A | 6/1995 |

* cited by examiner

*Primary Examiner*—Roy King
*Assistant Examiner*—Tima McGuthry-Banks
(74) *Attorney, Agent, or Firm*—Norris McLaughlin & Marcus

(57) ABSTRACT

The direct reduced iron (DRI) which for at least 80 wt-% has a grain size of not more than 3 mm is melted in an electric arc furnace. The furnace contains a bath of liquid iron. During the operation of the furnace a foamy slag layer is formed on the bath and the DRI falls by gravity through at least one movable lance into the foamy slag layer on the iron bath. Preferably, the distance of the aperture of the lance to the iron bath is kept practically constant.

4 Claims, 2 Drawing Sheets

METHOD OF MELTING FINE GRAINED DIRECT REDUCED IRON IN AN ELECTRIC ARC FURNACE

DESCRIPTION

This invention relates to a process of melting fine grained, direct reduced iron (DRI), which for at least 80 wt-% has a grain size of not more than 3 mm, in an electric arc furnace containing a bath of liquid iron and on the liquid iron a foamy slag layer, where during the operation of the furnace the DRI is fed through at least one lance from above through the aperture of the lance into the foamy slag layer on the liquid iron bath, said lance being introduced through the roof of said furnace. Among experts, direct reduced iron is also referred to as sponge iron or DRI (direct reduced iron).

Such a process is described in DE 196 08 530 A1, where the DRI is blown onto the iron bath through the lance with a carrier gas consisting mainly of $CO_2$. By that means one prevents the formation of FeO caused by the use of air and the related poor formation of foamy slag, as well as the decrease in quality of steel caused by the injection of nitrogen containing air.

The U.S. Pat. No. 5,433,767 describes the direct reduction of fine grained iron ore in at least two fluidized beds, where hot reduction gas is also used as fluidizing gas. There is produced fine grained DRI which is subsequently liquefied in a melting reactor at temperatures of 1500 to 1700° C. and is further reduced. The production of fine grained DRI is also described in the U.S. Pat. No. 5,603,748.

It is the underlying object of the invention to feed the fine gained direct reduced iron also in the hot condition in a simple manner largely free of loss to the iron bath during the operation of the furnace and at the same time forming a low amount of off-gas. In accordance with the invention this is achieved in the above-mentioned process in that the DRI falls through the lance or lances onto the iron bath solely by gravity and without the use of a carrier gas. Apart from the DRI other granular or lumpy iron may also be added to the iron bath, e. g. steel scrap, hot briquetted iron or pig iron. The portion of DRI fed through the lance or lances usually amounts to 85 to 100 weight percent of the total feed material.

During the operation of the furnace gases are constantly ascending from the iron bath which are discharged through the roof of the furnace in form of an off-gas. For the sake of economy it is desirable to minimize the amount of off-gas.

The introduced DRI first of all enters the more or less foamy slag layer, where it is either directly molten or sinks into the iron bath due to its weight and the movement of the liquid bath which is induced by electrical currents. The foamy slag layer prevents that fine grained DRI introduced via the lance is entrained by the ascending gases and discharged from the furnace, which would lead to increased losses of iron. By not using a carrier gas blown through the lance these losses are kept low. Entrained iron may also form accretions in the upper part of the furnace or in the waste gas ducts and thus lead to interruptions in furnace operation.

The electric arc furnace may be operated in the known manner with direct current or alternating current. It is also known to design the electrodes introduced through the furnace roof as vertically movable electrodes and gradually raise the same during the operation of the furnace so that their distance from the bath remains more or less constant during the batch operation.

The fine grained DRI is supplied onto the iron bath through the roof of the furnace through one or several lances which may be provided with water cooling, if necessary. It is expediently prevented that the aperture of the lance or lances gets in contact with the liquid iron or the iron bath. Therefore, each lance is vertically movable, and the aperture of the lance is kept with practically constant distance above the surface of the iron bath. One possibility is that the lance like the electrode is pulled upwards dependent of the rising level of the iron bath. Expediently, the distance of the aperture of each lance from the surface of the iron bath is 3 to 100 cm, and mostly 5 to 50 cm. It is ensured that the lance aperture is always kept inside the foamy slag layer, so that no DRI is entrained to the roof of the furnace by ascending gases.

By separately adding carbon and oxygen it can be ensured in a manner known per se that a stable foamy slag layer is formed on the iron bath and is maintained there during the operation of the furnace. This layer constitutes a reaction zone, which protects the fine grained DRI from reoxidation. At the same time it provides for the immersion of the electrode(s), to protect it or them from oxidation and improve the heat transfer from the arc flare to the melt.

Carbon-containing media and $O_2$-containing gas are supplied to the iron bath through submerged tuyeres. The carbon-containing media may be solid, liquid or gaseous, and as $O_2$-containing gas there is commonly used technically pure oxygen. The submerged tuyeres may be arranged as desired, e.g. in the bottom of the furnace or in the side walls. Expediently, the gas space above the foamy slag comprises one or several injectors to introduce $O_2$-containing gas, so as to effect a partial afterburning of CO.

The iron bath of the furnace usually consists of at least 90 wt-% liquid iron. The furnace may be used for producing hot metal or liquid steel. The liquid metal is withdrawn from the furnace at temperatures in the range from 1300 to 1700° C. and preferably at a temperature of at least 1350° C. in the case of hot metal and at least 1550° C. in the case of steel.

BRIEF DESCRIPTION OF THE DRAWING

Embodiments of the process will be explained with reference to the drawing, wherein.

Figure 1:
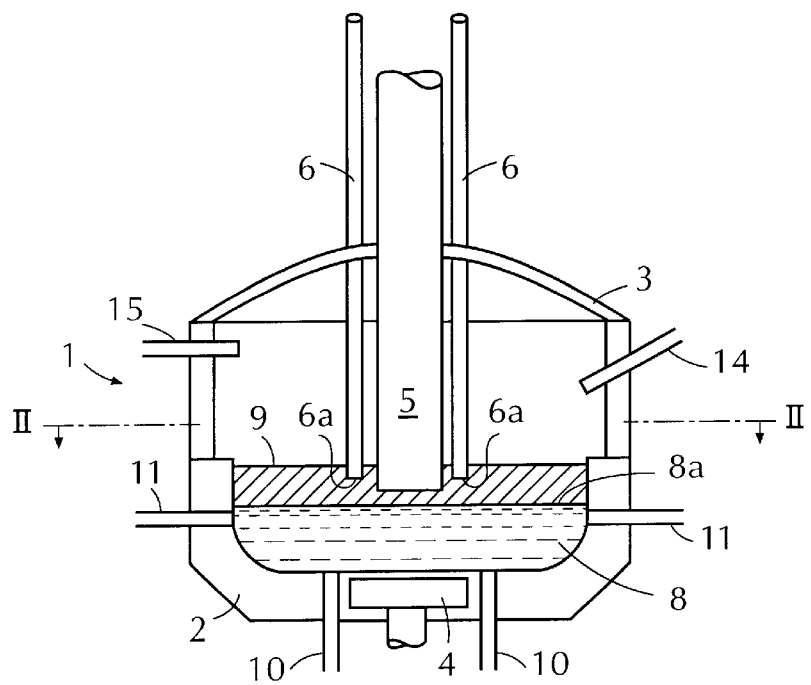
FIG. 1 shows a vertical section along line I—I of FIG. 2 through a DC electric arc furnace in a schematic representation.
Figure 2:
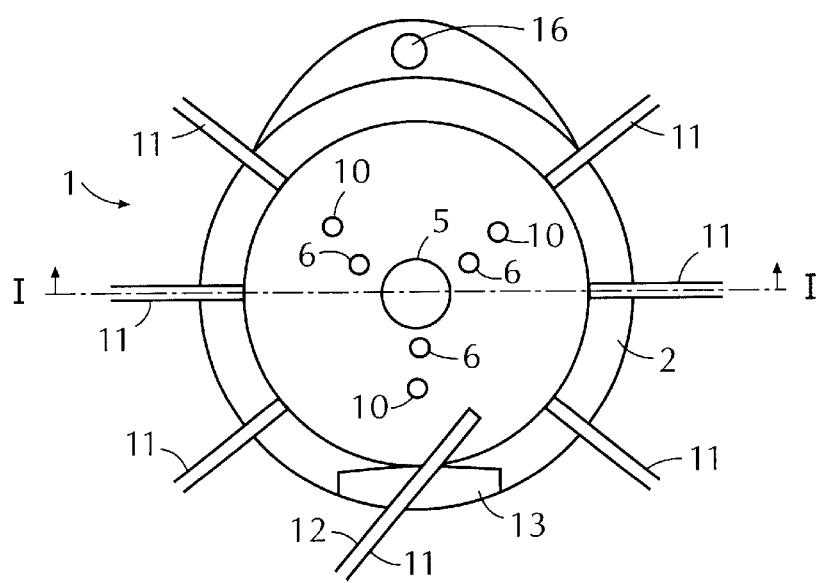
FIG. 2 shows a horizontal section along line II—II of FIG. 1.

The electric arc furnace (1) of FIGS. 1 and 2 comprises a bricklined bottom (2) and a removable roof (3). The bottom is provided with at least one bottom electrode (4). Having been introduced through holes in the roof (3), an upper electrode (5) and three hollow lances (6) protrude from the top into the interior of the furnace, of which lances only two are shown in FIG. 1. The number of the upper electrodes (5) and the lances (6) may also be chosen different from that in the drawing. The lances (6) are provided with a water cooling, which is not represented in the drawing. During the operation, the furnace (1) contains an iron bath (8) which reaches up to the bath level (8a). During the operation of the furnace a layer (9) of foamy slag is formed above the bath level (8a), which is desired. Through submerged tuyeres

(10) and (11) carbon-containing media and/or $O_2$-containing gas is introduced into the iron bath (8). Through a double lance (12)—see FIG. 2—oxygen and carbon-containing media can be blown through the opened furnace door (13) into the slag layer (9), thereby promoting the foam formation in a manner known per se. By means of lateral injectors (14) disposed at an angle above the bath, oxygen can be blown onto the bath in a manner known per se. Horizontal injectors (15) are used in a likewise known manner for supplying oxygen, so as to afterburn CO.

The upper electrode (5) can, as is likewise known, be adjusted vertically, so that its distance from the bath level (8a) is kept practically constant with rising liquid level of the iron bath. Through the lances (6) the fine grained DRI falls from a not represented storage bin into the furnace (1) so that it is absorbed by the iron bath (8) without any remarkable losses. For this purpose, the apertures (6a) of the lances (6) are disposed at a relatively short distance above the bath level (8a) and in the foamy slag layer (9). Like the upper electrode (5), the lances (6) can also be moved vertically upwards, so that the desired distance of the apertures (6a) of the lances (6) from the bath level (8a) is maintained. This distance usually lies in the range from 3 to 100 cm, and preferably 5 to 50 cm, and it is preferably kept constant during operation of the furnace. The DRI can also be introduced hot into the furnace through the lances (6), e.g. originating from a direct reduction plant at temperatures of 300 to 1000° C.

The furnace (1) is operated batchwise, and at the end of a melting phase hot metal or liquid steel are withdrawn through the sealable taphole (16), see FIG. 2.

Figure 3:
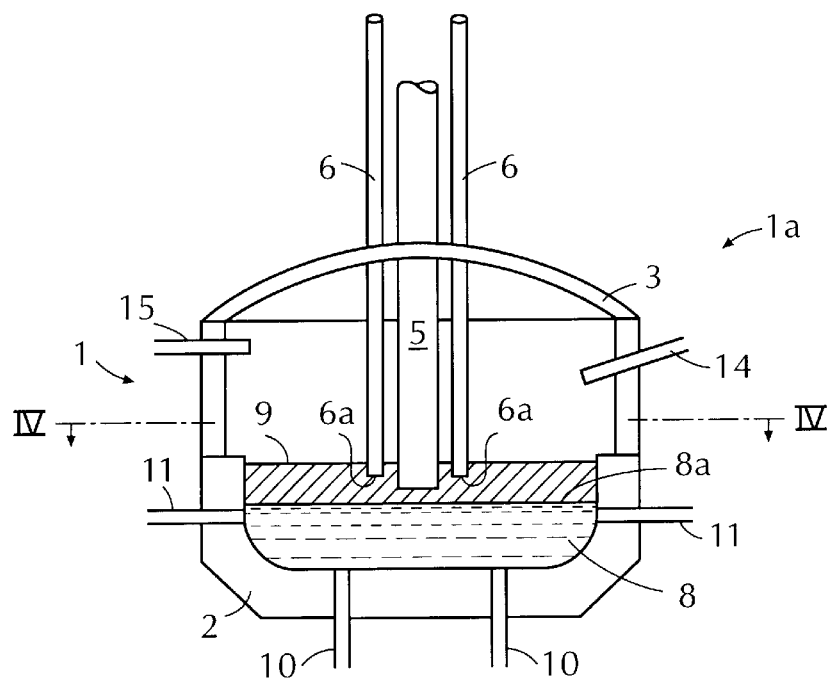
FIG. 3 shows an AC electric arc furnace in a representation analogous to FIG. 1, in a section along line III—III of FIG. 4.
Figure 4:
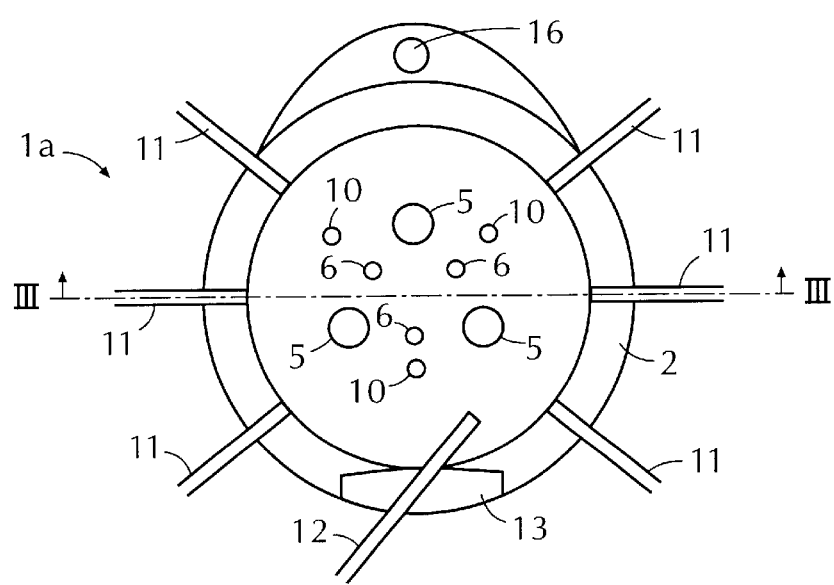
FIG. 4 shows a horizontal section along line IV—IV of FIG. 3.

The AC electric arc furnace (1a) shown in FIGS. 3 and 4 comprises three upper electrodes (5) of which only one is shown in FIG. 3. Moreover, the reference numerals have the meaning already explained in conjunction with FIGS. 1 and 2.

EXAMPLE

There is employed an electric arc furnace operated with three-phase alternating current, as it is represented in FIGS. 3 and 4. The furnace is capable of being tilted. The bottom (2) has a capacity of 150 t liquid iron, the current is supplied by a transformer with 100 MVA. The three electrodes (5) consist of graphite, their distance from the iron bath is kept constant at 5 cm.

Before the first DRI is charged into the furnace after an extended downtime, there is first of all produced a metal bath of 1560° C. through partial melting of 40 t steel scrap. Through three water-cooled lances (6) DRI with an upper grain size limit of 1.2 mm is charged into this bath, which comes from a fine ore direct reduction plant and has a temperature of 650° C. The DRI contains 7 wt-% FeO, 4 wt-% $SiO_2$, 2 wt-% $Al_2O_3$ and 1 wt-% C apart from metallic iron. The apertures (6a) of the lances (6) have a distance of 8 cm from the bath level (8a) which is controlled and kept constant over the entire melting phase. The feed rate of direct reduced iron is 1.2 t/min per lance.

Through the submerged tuyeres (11), 5 $Nm^3$/min technically pure oxygen and 25 kg/min carbon in the form of light fuel oil are introduced into the furnace, and in addition lime is supplied at a rate of 300 kg/min. Moreover, through the double lance (12) which is adjustable in a manner known per se and is immersed in the foamy slag layer (9), minor amounts of oxygen and carbon are blown in, so as to support the formation of a stable foamy slag layer. There is produced a steel melt of 1630° C. which is withdrawn from the furnace after an operating time of one hour. At a temperature of 1630° C. the amounts of DRI, carbon, oxygen and lime supplied to the furnace provide a steel quantity of 150 t with a carbon content of 0.1 wt-% The slag formed has a basicity (weight ratio $CaO/SiO_2$) of 2.5. Upon tapping, 30 t of the steel remain in the furnace, so that with the next heat the supply of DRI can immediately be started without having to melt steel scrap.

What is claimed is:

1. A process of melting fine-grained, direct reduced iron (DRI), wherein at least 80% by weight thereof has a grain size of not more than 3 mm, in an electric arc furnace containing a bath of liquid iron and on the liquid iron a foamy slag layer, where during the operation of the furnace the DRI is fed through at least one vertically adjustable lance from above and through the aperture of the lance into the foamy slag layer and falls through said foamy layer onto the liquid iron, said lance being introduced through the roof of the furnace, wherein the DRI falls through the lance or lances onto the iron bath solely by gravity and without the use of a carrier gas, with each lance aperture being disposed in the foamy slag layer and held at a distance of from 3 to 100 cm above the surface of the iron bath during the operation of the furnace, and the content of the DRI fed to the iron bath through the lance or lances in the entire charge of iron material is 85 to 100 wt %.

2. The process as claimed in claim 1, wherein the furnace has tuyeres for introducing carbon-containing media and $O_2$-containing gas.

3. The process as claimed in claim 1, wherein the DRI is introduced into the furnace at temperatures in the range of from 300 to 1000° C.

4. The process as claimed in claim 1, wherein the iron bath comprises pig iron or steel.

* * * * *